United States Patent
Laraqui et al.

(10) Patent No.: US 9,596,140 B2
(45) Date of Patent: Mar. 14, 2017

(54) METHODS AND ARRANGEMENTS FOR PROVIDING RADIO ACCESS AT LOCAL SITE

(71) Applicant: Telefonaktiebolaget L M Ericsson (publ), Stockholm (SE)

(72) Inventors: Kim Laraqui, Solna (SE); Henrik Almeida, Hägersten (SE); Boris Dortschy, Hägersten (SE); Chenguang Lu, Sollentuna (SE); Elmar Trojer, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/767,963

(22) PCT Filed: Mar. 7, 2013

(86) PCT No.: PCT/SE2013/050199
§ 371 (c)(1),
(2) Date: Aug. 14, 2015

(87) PCT Pub. No.: WO2014/137256
PCT Pub. Date: Sep. 12, 2014

(65) Prior Publication Data
US 2016/0006615 A1    Jan. 7, 2016

(51) Int. Cl.
*H04B 10/2575* (2013.01)
*H04L 12/24* (2006.01)
(Continued)

(52) U.S. Cl.
CPC ... *H04L 41/0886* (2013.01); *H04B 10/25753* (2013.01); *H04B 10/25758* (2013.01);
(Continued)

(58) Field of Classification Search
CPC ................. H04B 10/2575–10/25759
(Continued)

(56) References Cited

U.S. PATENT DOCUMENTS

| | | | | |
|---|---|---|---|---|
| 5,339,184 A * | 8/1994 | Tang | ............... | H04B 10/25752 370/343 |
| 6,016,426 A * | 1/2000 | Bodell | ............ | H04B 10/25759 455/422.1 |

(Continued)

FOREIGN PATENT DOCUMENTS

| | | |
|---|---|---|
| CN | 102546504 A | 7/2012 |
| EP | 2 273 699 A1 | 1/2011 |

(Continued)

OTHER PUBLICATIONS

International Search Report issued in corresponding International application No. PCT/SE2013/050199, date of completion of the search Feb. 11, 2014.

(Continued)

*Primary Examiner* — Li Liu
(74) *Attorney, Agent, or Firm* — Patent Portfolio Builders PLLC

(57) ABSTRACT

Methods and nodes for providing radio access to a communication network (314) for mobile terminals (T) at a local site (300). When a local transition unit (304) at the local site receives incoming signals from an antenna (302a) and associated radio head (302b) installed at the local site, the signals are converted into optical form and the local transition unit sends the signals in optical form over an optical link (306) to a central office (308) comprising a set of radio units (312). A central transition unit (310) at the central office converts the signals into a form adapted for reception by a radio unit. The central transition unit is further instructed by a control unit (316) to forward the signals to one of the radio units based on configuration data of the antenna/radio head.

(Continued)

The configuration data has been registered at the control unit when received from the antenna/radio head over a control channel automatically at installation. The central transition unit accordingly forwards the signals according to the instruction from the control unit to the correct radio unit for processing in digital format and digital transmission over the communication network.

24 Claims, 6 Drawing Sheets

(51) Int. Cl.
  *H04J 14/02*  (2006.01)
  *H04Q 11/00*  (2006.01)
  *H04W 88/08*  (2009.01)
(52) U.S. Cl.
  CPC .... *H04B 10/25759* (2013.01); *H04J 14/0282* (2013.01); *H04Q 11/0067* (2013.01); *H04Q 2011/0081* (2013.01); *H04W 88/085* (2013.01)
(58) Field of Classification Search
  USPC .................................................. 398/115–117
  See application file for complete search history.

(56) References Cited

U.S. PATENT DOCUMENTS

| | | | | |
|---|---|---|---|---|
| 6,308,085 | B1* | 10/2001 | Shoki | H04B 7/024 455/273 |
| 7,450,853 | B2 | 11/2008 | Kim et al. | |
| 2004/0037565 | A1* | 2/2004 | Young | H04B 10/25752 398/115 |
| 2005/0226625 | A1* | 10/2005 | Wake | H04B 10/25753 398/115 |
| 2010/0226304 | A1* | 9/2010 | Shoji | H04B 1/40 370/315 |
| 2011/0268449 | A1* | 11/2011 | Berlin | H04B 10/25753 398/115 |
| 2012/0155884 | A1* | 6/2012 | Han | H04B 10/25754 398/115 |
| 2013/0279452 | A1 | 10/2013 | Liu | |
| 2015/0125146 | A1* | 5/2015 | Erreygers | H04B 10/25 398/58 |

FOREIGN PATENT DOCUMENTS

| | | |
|---|---|---|
| EP | 2 416 506 A1 | 2/2012 |
| EP | 2 434 831 A1 | 3/2012 |
| EP | 2 493 260 A1 | 8/2012 |
| WO | 2014/005637 A1 | 1/2014 |

OTHER PUBLICATIONS

Written Opinion of the International Searching Authority issued in corresponding International application No. PCT/SE2013/050199, date of mailing of search report, Feb. 12, 2014.
International Preliminary Report on Patentability issued in corresponding International application PCT/SE2013/050199, date of completion of the report Apr. 29, 2015.
First Office Action in corresponding Chinese Application No. 201380074357.8 dated Oct. 9, 2016.
Extended European Search Report in corresponding European Application No. 13 877 291.8 dated Nov. 21, 2016.

* cited by examiner

METHODS AND ARRANGEMENTS FOR PROVIDING RADIO ACCESS AT LOCAL SITE

TECHNICAL FIELD

The present disclosure relates generally to methods, an arrangement and a central office for providing radio access to a communication network for mobile terminals at a local site.

BACKGROUND

In recent years, the use of mobile phones, "smartphones", laptops and tablets for wireless communication of speech and data has grown immensely such that the demands for capacity, performance and flexibility in public cellular networks for radio access has increased dramatically to meet this growth. The capacity of a cellular radio network is dependent on a range of factors such as the number and size of cells, available radio bandwidth, usage of radio resources, configuration of hardware and software, and so forth. For example, small cells may be introduced in addition to a large macro cell to increase capacity locally in limited areas with dense traffic, hence referred to as "hot spots". However, the need for capacity in certain areas may still go beyond the limits of the radio network resulting in unwanted latency as well as dropped or denied connections in the network.

A way of off-loading a public cellular radio network is to provide access points for so-called mobile or wireless broadband and "Wifi" at certain indoor and outdoor locations such as within a building inhabited or visited by terminal users. At such a location, one or more access points with antennas can be installed which are connected to a public fixed network e.g. via modems and routers. For example, the well-known technique of Digital Subscriber Line (DSL) is often used to provide mobile broadband and Wifi to terminal users present in certain limited and well-defined locations such as, a residence, a hotel, an airport, a shopping mall, an office, a building with several apartments, to mention a few examples.

In this description, the term "local site" will be used to represent any such limited and well-defined location, either indoor or outdoor, public or private, where one or more access points with antennas can be installed for wireless Wifi or broadband access to a public network. Different radio technologies may also be used for such access points, e.g. GSM, LTE, Wifi, HSPA/WCDMA, and so forth. Further, the term "mobile terminal" will be used to represent any device or user equipment capable of radio communication with the above access point, including but not limited to mobile phones, smartphones, laptops and tablets.

When communicating over an access point installed in a local site, the users are often situated quite close to the access point antenna and relatively low transmission power is therefore usually sufficient to achieve proper signal reception, thus typically not causing much radio interference e.g. to any cellular network in the neighborhood. Unless the access point is highly deployed and/or the access point operates at frequencies that overlap with frequencies used by a macro site of the cellular network, which may potentially cause some interference. Nevertheless, high data rates can generally be achieved at fairly low costs by means of such access points and users will prefer to use a local access point, if available, instead of the cellular network for communication, thus off-loading the cellular network.

From a radio perspective, access points can provide services over both licensed and unlicensed radio bands. In case of unlicensed bands, as the network becomes more dense, high interference can be expected but certain measures can be taken in practice to mitigate the effects of such interference. This is due to the inherent concept and nature of "unlicensed" radio bands. In case of licensed bands, interference can be expected in-between closely located local site access points, as well as between the local site's access point and a macro radio. In-between local sites therefore, with densely deployed access points, interference mitigation will be needed since it is not likely that local site access points will operate on different frequencies. As for the relationship between a macro site and a local access point, they either operate on the same frequencies and thus will benefit from interference mitigation, or they operate on different frequencies separated from one another. The latter scenario is however more cumbersome, since it will require careful frequency planning, especially in the case of multi-operator deployments.

FIG. 1 illustrates a conventional arrangement in a local site 100, here illustrated as a building, having multiple access points 102 connected to a switch 104 or the like which provides a link to a public communication network 106 for transport of data packets to and from the network 106. The switch 104 could be implemented as a router, a gateway, or similar. In this example, three exemplary access points 102 are shown, each comprising an antenna 102a and a radio unit 102b having an associated digital unit, DU, which may be implemented with the switch 104 as shown or at each radio unit. Any coding and decoding of transmitted and received signals, respectively, are made in the radio units 102b according to regular procedures, e.g. depending on the radio technology used. Conversion of the signals between analog form, as received and transmitted by the antenna, and digital form, is also performed in the radio units 102b.

In this arrangement, a radio unit with associated digital unit are required for each access point and antenna 102, 102a. The "radio unit" in this figure typically comprises a complete radio base station, e.g. a femto base station, a wifi access point or similar, which is connected to the network 106 via Ethernet, Digital Subscriber Line (DSL), Passive Optical Network (PON), etc. Further, each radio unit 102b is typically "technology-specific" in the sense that it can only handle one certain radio technology, thus allowing communication only with terminals capable of that radio technology. Even though it would be possible to use two or more different radio units 102b for each antenna to enable different radio technologies, this alternative is rather complex and costly. The switch 104 comprises digital switching functionality which is also needed at the local site 100, and it must be capable of reading and forwarding data packets between the individual radio units 102b and the network 106. The switch and DU 104 may be placed in the building's basement, in an adjacent street cabinet, or other fitting space at the site 100 and may be connected to the network 106 by means of a conventional telephone cable that has been installed for the site 100.

FIG. 2 illustrates another conventional arrangement in a local site 200 with multiple access points 202 where each antenna has a separate radio head 202a which are all connected to the same shared radio unit 202b that processes signals to/from all the antennas, thus reducing the number of radio units to one. The radio head 202a is a unit that has the function of transferring electric signals in analog form between the respective antenna element and the shared radio unit 202b. Typically, the high frequency of received radio signals is down-converted to an Intermediate Frequency (IF) by the radio head to limit the propagation losses through wires and cables before the signals reach the radio unit 202b, and vice versa.

In the variant of FIG. 2, a switch with a Digital Unit DU 204 is likewise needed that is linked to a public communication network 206 and capable of reading and forwarding data packets to and from the radio unit 202b. Further, the shared radio unit 202b may be technology-specific unless a more advanced and more costly "multi-functional" radio unit is used capable of operating according to more than one radio technology. The shared radio unit 202b may be centrally placed in the basement, a street cabinet or other fitting place at the local site 200, e.g. together with the switch and DU 204, but not too far away from the antenna and radio heads 202a to keep the propagation losses low.

However, it is a drawback that the above-described conventional arrangements and others are limiting with respect to radio technology in that each antenna and associated radio unit allow for only one radio technology at a time. Another drawback is that radio units, digital units and switches are costly components to install and maintain at local sites, and using two or more different radio units or a multi-functional radio unit to allow for different radio technologies would add further complexity and costs, as explained above. In addition, although the radio heads are technically able to support multiple operators, different operators will want to deploy their own radio units, digital units, and often also switches, anyway. Otherwise, various network/operator-specific parameters must be configured in both the radio units and the switches. Typically, multiple sets of radio units, digital units and switches are arranged for different operators in the same local site in a multi-operator scenario. Thus, if more than one radio technology and/or more than one operator are to be deployed at a local site with access points, a range of different technology and/or operator specific radio units and digital units are needed at the local site which is obviously a costly and complex solution, making the deployment of access points in local sites less attractive.

Another possibility known in the art is to avoid costly installations at the local site by placing the radio equipment in another location remote from the local site, which is shown in WO 2004/019524 A1. Here, the radio equipment is referred to as a base station, or "BTS", which is placed in a location called "BTS Hotel" and antenna signals are transferred between the local site, called "remote node", and the BTS Hotel in optical form in order to keep down the propagation losses. A unit called "MUX/WDM" is used both at the BTS Hotel and the remote node for multiplexing and optical conversion of the antenna signals. In the shown arrangement, it is necessary to configure a switching function at the BTS Hotel called "local hub" more or less manually to connect each BTS with the correct remote node or site. However, this manual work can be quite laborious, particularly in case the BTS Hotel would serve a great number of local sites.

SUMMARY

It is an object of embodiments described herein to address at least some of the problems and issues outlined above. It is possible to achieve this object and others by using methods, an arrangement and a central office as defined in the attached independent claims. The arrangement in this context could also be referred to as a system, an apparatus, or the like.

According to one aspect, a method is presented for providing radio access to a communication network for one or more mobile terminals at a local site. In this method, a local transition unit at the local site receives analog signals from at least one antenna and associated radio head installed at the local site, when the at least one antenna receives the signals from the one or more mobile terminals. The local transition unit then converts the analog signals into optical form and sends the signals in optical form over an optical link to a central office which comprises or is connected to a set of radio units.

A central transition unit at the central office converts the signals into a form adapted for reception by a radio unit. A control unit instructs or has instructed the central transition unit to route the signals to at least one of the radio units based on configuration data of the at least one antenna and associated radio head, wherein said configuration data has been registered at the control unit when received in control signalling from the at least one antenna and associated radio head. The central transition unit then forwards the signals according to the instruction from the control unit to the at least one of the radio units for digital processing and transmission over the communication network.

Thereby, manual work for providing connectivity for access points installed at a local site to one or more radio technology and/or operator specific radio units implemented in a remotely located central office, can be avoided or at least reduced. Furthermore, the equipment needed at the local site is relatively simple and inexpensive.

According to another aspect, an arrangement is presented for providing radio access to a communication network for one or more mobile terminals at a local site. This arrangement comprises a local transition unit for operation at the local site and adapted to receive analog signals from at least one antenna and associated radio head installed at the local site, when the at least one antenna and associated radio head receives the analog signals from the one or more mobile terminals. The local transition unit is further adapted to convert the analog signals into optical form and to send the signals in optical form over an optical link to a central office comprising or being connected to a set of radio units.

The arrangement also comprises a central transition unit for operation at the central office and adapted to convert the signals into a form adapted for reception by a radio unit in the set of radio units. The arrangement further comprises a control unit adapted to instruct the central transition unit to route the signals to at least one of the radio units based on configuration data of the at least one antenna and associated radio head, wherein the configuration data has been registered at the control unit when received in control signalling from the at least one antenna and associated radio head. The central transition unit is further adapted to forward the signals according to the instruction from the control unit to said at least one radio unit for digital processing and transmission over the communication network.

According to yet another aspect, a method is presented to be performed by a central transition unit when operating at a central office for providing radio access to a communication network for one or more mobile terminals at a local site. In this method, the central transition unit receives, from a local transition unit at the local site, signals in optical form over an optical link when the local transition unit has received the signals from at least one antenna and associated radio head installed at the local site and has converted the signals into said signals in optical form. The central transition unit then converts the signals into a form adapted for reception by a radio unit.

The central transition unit further receives or has received instruction from a control unit to route the signals to at least one of a set of radio units comprised in or being connected to the central office based on configuration data of the at least one antenna and associated radio head. The configuration data has been registered at the control unit when received in control signalling from the at least one antenna and associated radio head. The central transition unit then forwards the signals according to the instruction from the control unit to the at least one radio unit, for digital processing and transmission over the communication network.

According to yet another aspect, a central transition unit is configured for operation at a central office and to enable radio access to a communication network for one or more mobile terminals at a local site. The central transition unit comprises a first communication circuit which is adapted to receive, from a local transition unit at the local site, signals in optical form over an optical link, when the local transition unit has received the signals from at least one antenna and associated radio head installed at the local site and has converted the signals into said signals in optical form. The central transition unit also comprises a converting circuit adapted to convert the signals into a form adapted for reception by a radio unit.

The central transition unit further comprises a second communication circuit adapted to receive instruction from a control unit to route the signals to at least one of a set of radio units comprised in or being connected to the central office based on configuration data of the at least one antenna and associated radio head. The configuration data has been registered at the control unit when received in control signalling from the at least one antenna and associated radio head. The second communication circuit is also adapted to forward the signals according to the instruction from the control unit to the at least one radio unit for digital processing and transmission over the communication network.

The above methods, arrangement and central office may be configured and implemented according to different optional embodiments to accomplish further features and benefits, which will be described below.

BRIEF DESCRIPTION OF DRAWINGS

The solution will now be described in more detail by means of exemplary embodiments and with reference to the accompanying drawings, in which.

DETAILED DESCRIPTION

Figure 1:
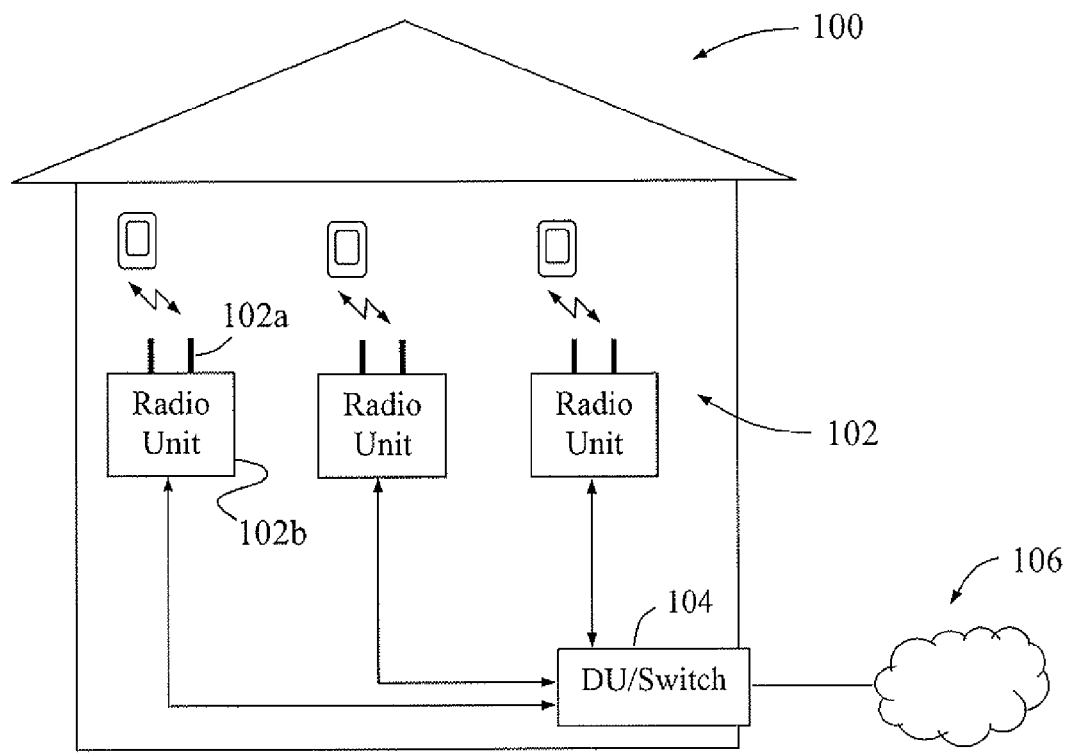
FIG. 1 is a scenario illustrating a conventional arrangement for radio access at a local site, according to the prior art.

Briefly described, a solution is presented to avoid or reduce the need for manual work to provide connectivity for access points at a local site to one or more radio technology and/or operator specific radio units implemented in a remotely located central office. The above-described radio units and digital units are thus placed at the central office such that one or more antennas with associated radio heads and a relatively simple component, which will be referred to as a "local transition unit", are the only equipment needed at the local site for communicating analog signals in optical form over an optical link such as a fibre between the local site and the central office. Further, it may be necessary to characterize the "medium", e.g. a copper cable, used for connecting each radio head with the local transition unit. In the embodiments described here, when an antenna and radio head are installed at a local site the central office is configured automatically for switching signals between the installed antenna/radio head and an associated radio unit, i.e. not requiring any manual work.

By transferring the analog signals to and from each antenna/radio head in optical form between the local site and the central office, the central office can be located virtually at any distance from the local site since the propagation losses over the optical link are negligible as compared to electrical cables or wires. This also enables placement of the radio units in the central office which is possible by performing conversion of the signals between electrical and optical forms by the local transition unit and by a corresponding central transition unit at the central office.

Further, configuration data has been registered on the antennas/radio heads before installation at the local site which configuration data relates to one or more radio technologies and/or one or more operators associated with the respective antennas/radio heads. First, when a new antenna/radio head is installed and connected to the local transition unit, the configuration data is conveyed from the radio head over an analog in-band control channel to the local transition unit. The configuration data is used between the local transition unit and the radio head to characterize the medium between them, e.g. including which frequencies to use over the connecting cable which may be a copper twisted pair. Following that, the local transition unit may determine how to map incoming analog signals from the radio head towards the central office, and possibly also determine to which central office the signals should be mapped in the case when the local site is connected to more than one central office.

Next, the local transition unit may map the analog control channel from the radio head to the central office. At the central office, the central transition unit will automatically extract any control channels identified from newly discovered analog channels not yet recognized. The central transition unit will forward such control channels to a control unit located at the central office and being maintained and operated by one or more network operators associated with the radio units. This control unit will then engage directly with the radio head. Thus, the radio head is engaged twice to exchange its configuration data, once with the local transition unit and once with the control unit via the central transition unit. It is an advantage that the local transition unit can be made quite simple and stateless.

The configuration data is thus automatically conveyed to and registered at the central office when the antennas/radio heads are installed, for mapping the antennas/radio heads to their correct radio units such that each antenna/radio head at the local site is associated with a particular radio unit at the central office. Thereby, flexibility is achieved by using the configuration data to associate the antennas/radio heads to different radio technologies and/or operators, while the antenna/radio head equipment as such allows for usage of any radio technologies and/or operators.

As explained above, the configuration data of the antennas/radio heads is conveyed over their respective control channels to the control unit at the central office when the antennas/radio heads are installed, and the configuration data is registered in the control unit for the installed antennas/radio heads. The control unit is then able to instruct the central transition unit to route incoming signals to the correct radio unit and conversely to route outgoing signals to the correct local site, based on the configuration data of the antennas/radio heads registered in the control unit.

It should be noted that the antenna/radio head does not transmit any radio signals over the air unless there is a connection between the radio head and a radio unit. After the installation has been completed and the connection between the radio head and radio unit is established, thus enabling the radio interface to become active, incoming signals received by an antenna and associated radio head are converted from electrical to optical form by the local transition unit and sent over the optical link to the central transition unit at the central office. The central transition unit then converts the incoming optical signals back to electrical form and routes and forwards them, as instructed by the control unit based on the configuration data, to a radio unit at the central office that is assigned to handle signals from and to the receiving antenna/radio head. Outgoing electrical signals, coming from the radio unit to be transmitted by the antenna, are conveyed in a converse manner to the antenna. Thus, the central transition unit converts the outgoing electrical signals into optical form and routes them to the local site, as instructed by the control unit based on the configuration data, over the optical link. The local transition unit then converts the optical signals back to electrical form for transmission on the radio interface from the antenna.

Figure 2:
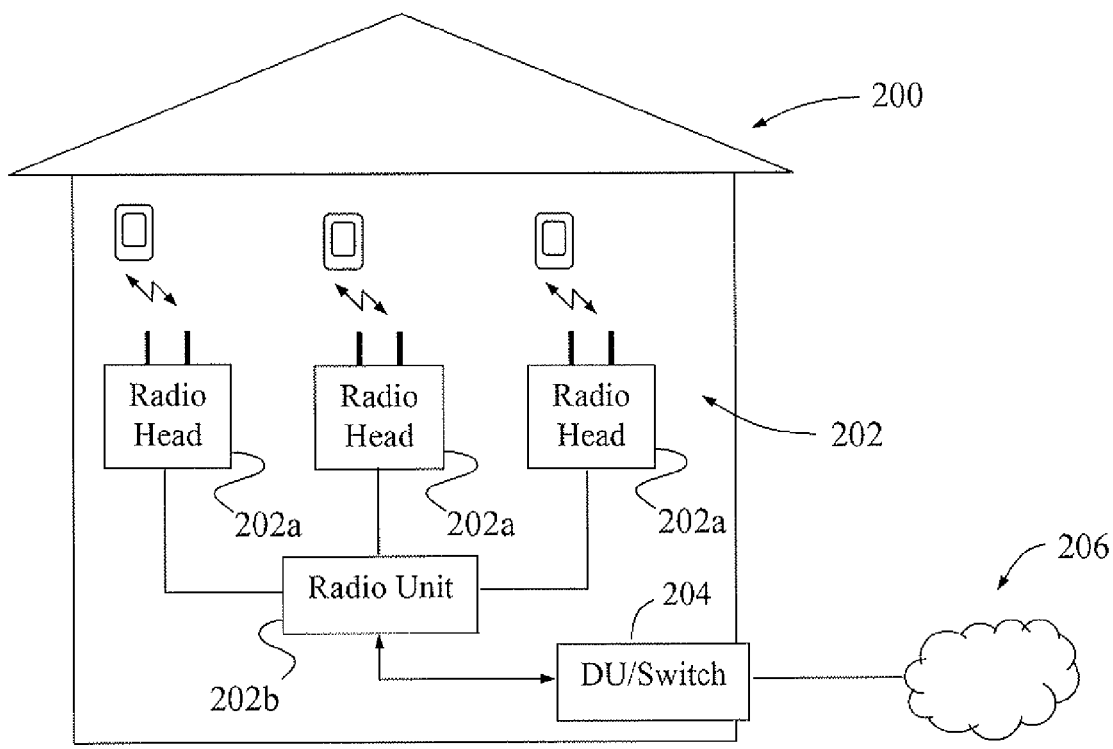
FIG. 2 is a scenario illustrating another conventional arrangement for radio access at a local site, according to the prior art.

The configuration data registered in the control unit at installation of the antenna/radio head at the local site is thus used for mapping the antennas/radio heads to their correct radio units, and vice versa, for both incoming and outgoing signals. Since the equipment needed at the local site in this solution, i.e. the antenna, radio head and local transition unit, can be comprised of quite simple components compared to the conventional solutions described for FIGS. 1 and 2, and each antenna/radio head can be mapped to the correct radio unit at the central office automatically based on the configuration data registered in the control unit, the costs and efforts for providing radio access to a communication network for mobile terminals at the local site can be significantly reduced. Further, the central transit unit can be used to serve any number of different access points in multiple local sites, where antennas/radio heads can be added and removed over time, which provides for great flexibility.

Throughout this description, it should be understood that the phrase "at the local site" is not limited to being strictly inside a building or the like and the local transition unit may be placed either inside the building or outside the building within a limited distance e.g. in a street cabinet or the like that may serve antennas in one or more nearby buildings. Since the signals are transported in electrical form in either direction between the antenna/radio head and the local transition unit where the conversion to/from optical form takes place, the distance there between should be short enough to ensure that the electrical signals do not lose the information they are carrying, typically within the range of one or two hundred meters. Once converted into optical form, the signals can be transported over much longer distances between the local site and the central office without losing the carried information due to the low propagation losses, as explained above.

The solution will now be described initially with reference to an exemplifying communication scenario depicted in FIG. 3. In this scenario, a local site 300 is shown, in this case illustrated as a building, where the above-mentioned local transition unit 304 is installed as connected to a plurality of antennas 302a with associated radio heads 302b, collectively denoted 302. As explained above, the local transition unit 304 may be placed inside or outside the shown building and the solution is not limited in this respect.

The local transition unit 304 is a component that is configured to receive electrical signals from the antennas/radio heads 302, convert them into optical signals and multiplex the optical signals onto an optical link 306, and vice versa. In this respect, the local transition unit 304 may be a standard component performing the electrical/optical conversion and multiplexing and de-multiplexing to/from an optical fibre in a manner known as such, e.g. as described in WO 2004/019524 A1. In this document, FIG. 3 illustrates a multiplexing technique to transmit several RF signals over a single optical link using different wavelengths for the different antennas.

The local transition unit 304 may also be used to characterize the medium of the connection between unit 304 and the connected radio heads 302b, for example so that the radio heads 302b and local transition unit agree on which frequencies to use over the medium, e.g. a copper cable. The frequencies to use are selected and can vary, e.g. depending on the nature of the medium, the length, any existing impairments across the medium, and so forth. The local transition unit 304 can also use a control channel between unit 304 and each antenna/radio head to extract information in control signals regarding the nature of the radio head, i.e. as stored on the radio head. This information may be used by the local transition unit 304 to map the signals from the radio head towards the correct central office.

The optical link 306 connects the local transition unit 304 to a central office 308 comprising a central transition unit 310 which is connected to a set of radio units 312. The radio units, "RU", 312 are further capable of communicating data carried by the above signals to and from a communication network 314 according to different radio technologies and/or for different network operators. In this example, four different radio units 312 are shown: First, "RU 1a" is controlled by a first operator "1" and uses a radio technology "a". Second, "RU 1b" is controlled by the same operator "1" but uses another radio technology "b". Third, "RU 2a" is controlled by another operator "2" and uses the radio technology "a". Fourth, "RU 2b" is controlled by the operator "2" and uses the radio technology "b". This is just an illustrative example and it can be understood that this solution may be used for any number of radio units associated with any combination of radio technologies and/or network operators, thus not being limited in this respect.

The central transition unit 310 is configured to convert incoming and outgoing signals between optical and a form adapted for handling by a radio unit, as well as to perform multiplexing and de-multiplexing of the optical signals to and from the optical link 306, basically in the same manner as the local transition unit 304. The figure indicates that the signals may be conveyed in electrical form between the radio heads 302b and the local transition unit 304 and also between the radio units 312 and the central transition unit 310, while the signals are conveyed in optical form between the local transition unit 304 and the central transition unit 310 over the optical link 306. The figure also indicates that the signals are analog all the way between the antennas 302a and the radio units 312, and that digital signals are communicated between the network 314 and the radio units 312, the latter thus having some kind of digital unit and analog/digital conversion which is somewhat outside the scope of this solution. The central transition unit 310 will automatically extract all control channels originating from individual radio heads and forward them towards a control unit 312 located at the central office 308. It should be noted that before a connection is configured and established between a radio head and a radio unit/digital unit, no radio signals are communicated between them.

At the central office 308, the control unit 316 instructs the central transition unit 310 to route incoming signals from the optical link 306 to at least one of the radio units 312 based on configuration data that has been registered at the control unit when the antennas and radio heads 302 were installed. The control unit 316 may be integrated with the central office 308 or a separate entity connected thereto, depending on the implementation. As indicated in the figure, the control unit 316 may be maintained and operated by one or more network operators e.g. by means of Operation Support Systems OSS, of which two examples are schematically shown as OSS 1 and OSS 2.

In more detail, configuration data has been registered on each antenna/radio head 302, e.g. hardcoded onto the equipment or transferred to the antenna/radio head 302 by means of so-called "Near Field communication Identity", NFID or similar. The configuration data is sent from the radio head 302b over the medium at installation and can be used to identify which operator and radio technology the antenna/radio head 302 is associated with. For example, the configuration data may indicate at least one radio frequency band supported by the antenna and associated radio head, which may indirectly identify the operator, the radio technology or both knowing the allocation of radio frequency band to different operators and/or radio technologies. The configuration data may also indicate more explicitly at least one network operator supported by the antenna and associated radio head, at least one radio technology supported by the antenna and associated radio head. The configuration data may further indicate a maximum transmit power supported by the antenna and associated radio head. On the whole, the configuration data can be used to create a mapping between the antennas/radio heads 302 and their associated radio units 312, which mapping is maintained in the control unit 316 and used for the routing of signals as described here.

When an antenna/radio head 302 is installed and connected to the local transition unit 304, the radio head 302b automatically issues control signals, or is triggered by the unit 304 to do so, the signals containing the configuration data which is conveyed to the local transition unit 304. The local transition unit 304 uses the control signals to characterize the connection between itself and the radio head 302b.

The local transition unit 304 also uses the configuration data obtained from the control channel to determine how to later map the radio head 302b towards the central office 308. Next, the local transition unit 304 will map the analog signals from radio head 302b via the optical link 306 to the central transition unit 310. At this point, a connection has been established between the radio head 302b and the central office 308. When the new optical signal is discovered at the central office 308, it engages directly with the radio head 302b and ensures that the control channel embedded in this connection is always terminated on the control unit 316.

The control unit 316 can now engage directly with the radio head 302b and registers the captured configuration data of the installed antenna/radio head 302. The control unit 316 is then able to determine which radio unit the installed antenna/radio head 302 is associated with, based on the captured configuration data, and thus maintains such configuration data and creates a mapping between each antenna/radio head 302 and their associated radio unit 312.

Once radio communication takes place for providing radio access to the network 314 for mobile terminals T at the local site 300, this mapping information is used for routing signals between the antenna/radio heads 302 and the radio units 312. FIG. 3a illustrates that the central office 308 with radio units 312 of FIG. 3 can be used for serving a plurality of local sites 300 to provide radio access to the network 314 over different optical links 306, in the manner described for FIG. 3 above.

An exemplifying procedure when such radio communication takes place will now be described with reference to the flow chart in FIG. 4 which illustrates actions that may be performed by a local transition unit 304 at a local site, a central transition unit 310 at a central office and a radio unit/digital unit 312 at the central office, respectively. These nodes and components are arranged in the manner shown in FIG. 3 and FIG. 4 illustrates the case when incoming signals from a mobile terminal T are received by an antenna and associated radio head 302. Reference will thus also be made to FIG. 3 when explaining the actions in FIG. 4. It is assumed that the antenna/radio head 302 is associated with the radio unit 312 being controlled by a specific network operator and using a specific radio technology, being indicated by configuration data on the antenna/radio head 302 that has been registered in a control unit 316 during installation, as explained above. This registration procedure will be described in more detail later below with reference to FIG. 7.

In a first action 400, the local transition unit 304 receives analog signals, e.g. in electric form, from the installed antenna/radio head 302 at the local site, when the antenna receives the signals from the terminal T. The analog signals received by the local transition unit 304 may have been down-converted from Radio Frequency, RF, to a lower Intermediate Frequency, IF, by the radio head 302, to limit the propagation losses when conveyed between radio head and local transition unit. In a next shown action 402, the local transition unit 304 converts the incoming analog signals into optical form and then sends the signals in optical form over the optical link 306 to the central transition unit 310 at the central office, in a further action 404, the central office 308 thus comprising or being connected to the radio unit 312. In the latter action, the local transition unit 304 multiplexes the incoming analog signals over the optical link 306 in a suitable manner, e.g. using a specific wavelength for any signals coming from the antenna/radio head 302. For example, different antennas/radio heads may be coupled to different input ports of the local transition unit 304 on which incoming signals are converted to optical form with corresponding wavelengths. In this action, it should not be excluded the possibility to convey the signals in a suitable digitized format over the actual optical link, and the solution is not limited in this respect.

When the optical signals arrive at the central transition unit 310, the latter unit 310 receives the signals in an action 406 and converts them into a "suitable" form adapted for reception by a radio unit, e.g. into electric form, in another action 408. In these actions, the optical signals may be de-multiplexed from the optical link e.g. depending on their wavelength. A further action 410 illustrates that the central transition unit 310 is instructed by the control unit 316 to route the signals to the radio unit 312 based on the configuration data of the antenna/radio head 302 which configuration data has been registered at the control unit 316 when received in control signaling from the antenna/radio head 302, as said above. Alternatively, the central transition unit 310 may already have received this instruction from the control unit 316 when the antenna/radio head 302 was installed, i.e. before communication with any terminal takes place, and an example of this will be described later on with reference to FIG. 7. The central transition unit 310 then forwards the signals according to the instruction from the control unit to the radio unit 312, in an action 412, for processing in digital format and transmission over the communication network 312.

A further action 414 illustrates that the radio unit 312 receives the routed signals, e.g. in electric form, from the central transition unit 310. Alternatively, it is possible that the signals are routed in optical form from the central transition unit 310, such that the conversion into electric form is done at the radio unit 312 instead. Further actions 416 and 418 illustrate that the radio unit 312 processes the signals in digital format, including creating data packets from the information carried by the signals, and transmits the packets to the network 314, respectively.

Figure 3:
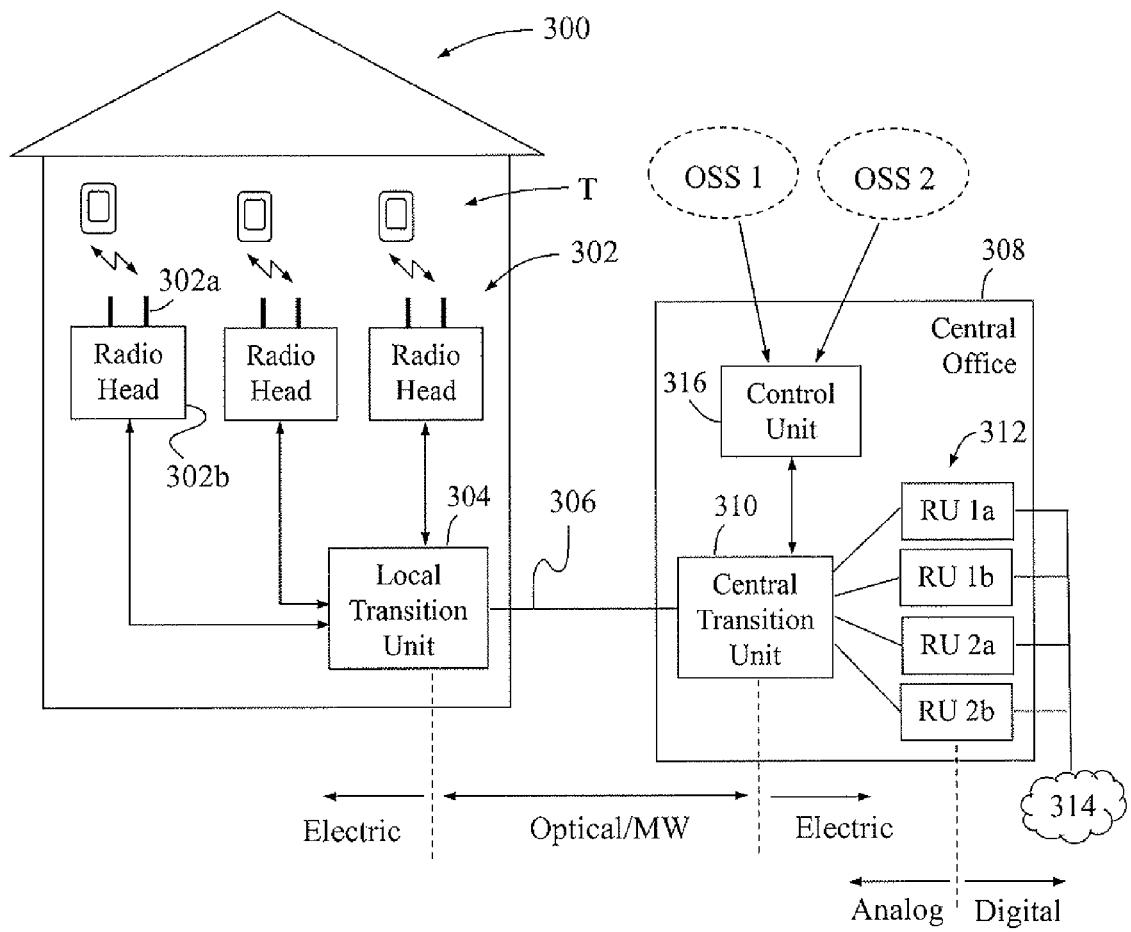
FIG. 3 is a scenario illustrating an arrangement for radio access at a local site, according to some possible embodiments.
Figure 3A:
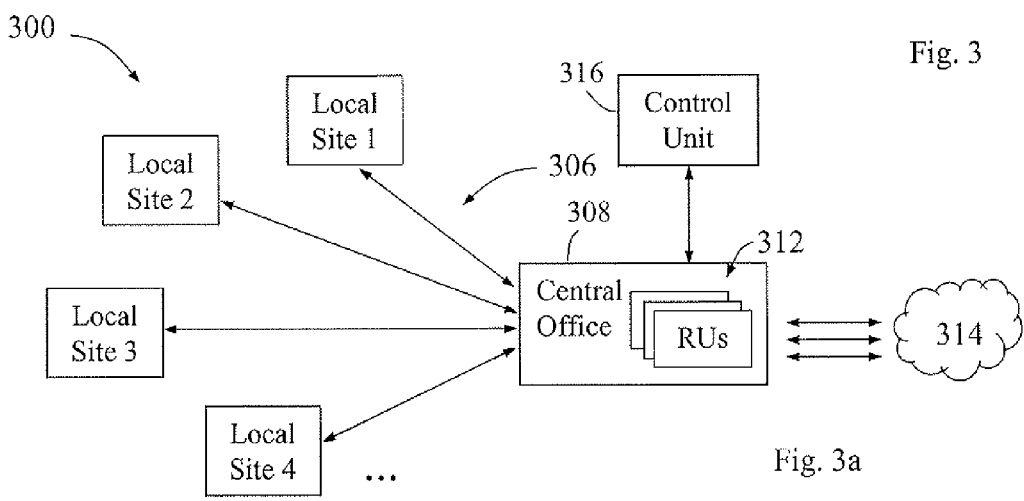
FIG. 3a illustrates schematically how the arrangement of FIG. 3 can be used for a plurality of local sites, according to further possible embodiments.
Figure 4:
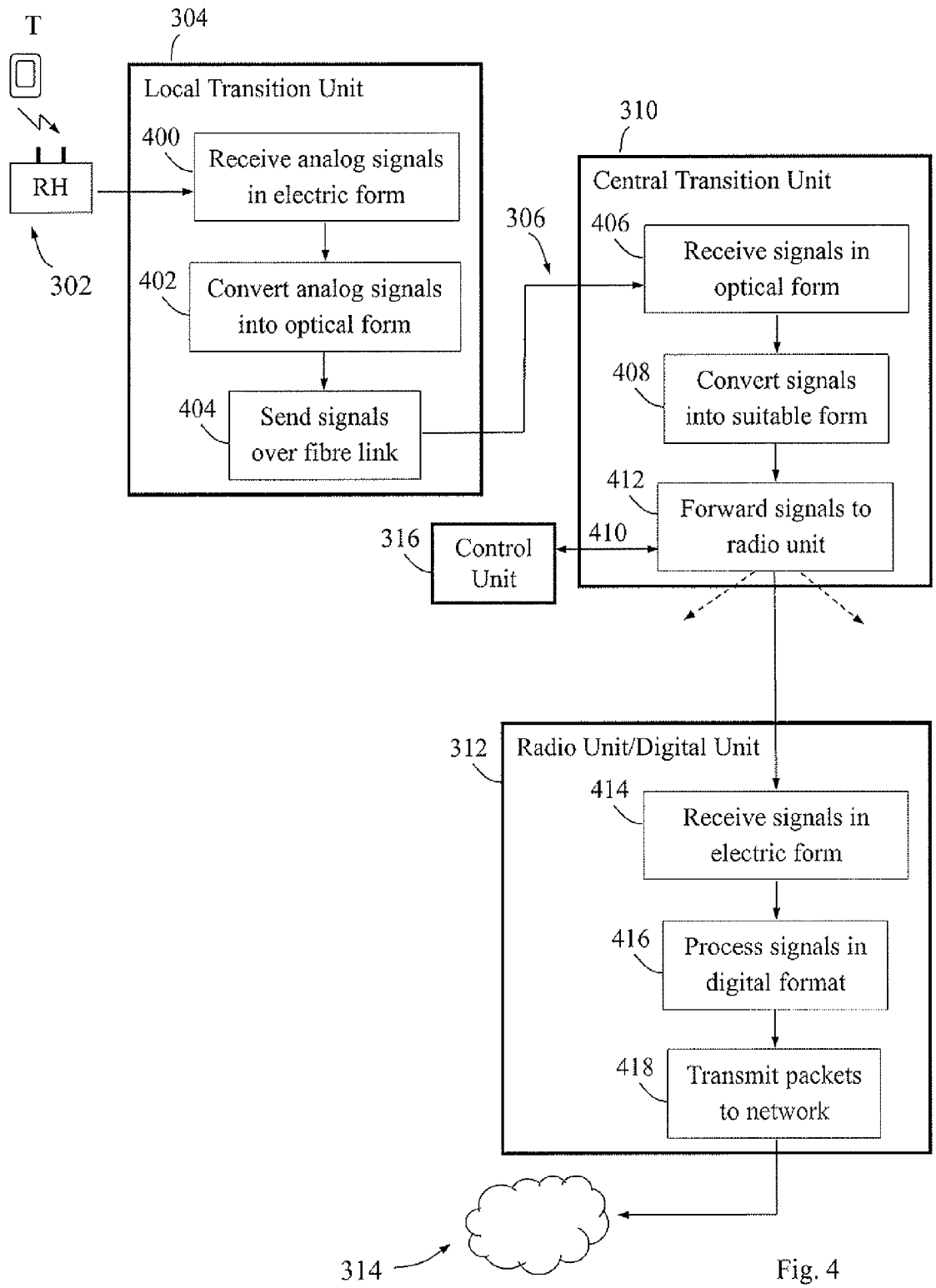
FIG. 4 is a flow chart illustrating a procedure in an arrangement for radio access at a local site when receiving signals from a mobile terminal, according to further possible embodiments.

FIG. 3 also illustrates an arrangement for providing radio access to the communication network 314 for one or more mobile terminals T at the local site 300. This arrangement comprises a local transition unit 304 for operation at the local site and adapted to receive analog signals, e.g. in electric form, from at least one antenna 302a and associated radio head 302b installed at the local site, when the at least one antenna and associated radio head 302 receives the analog signals from the one or more mobile terminals T. The local transition unit 304 is further adapted to convert the incoming analog signals into optical form and to send the signals in optical form over an optical link 306 to a central office 308 comprising or being connected to a set of radio units 312.

The arrangement also comprises a central transition unit 310 for operation at the central office and adapted to convert the signals into a form adapted to reception by a radio unit, e.g. electric form, and a control unit 316 adapted to instruct the central transition unit 310 to route the signals to at least one of the radio units based on configuration data of the at least one antenna and associated radio head. This configuration data has been registered at the control unit 316 when received in control signaling from the at least one antenna and associated radio head 302. The central transition unit 310 is further adapted to forward the signals according to the instruction from the control unit 316 to the at least one radio unit 312 for digital processing and transmission over the communication network.

Figure 5:
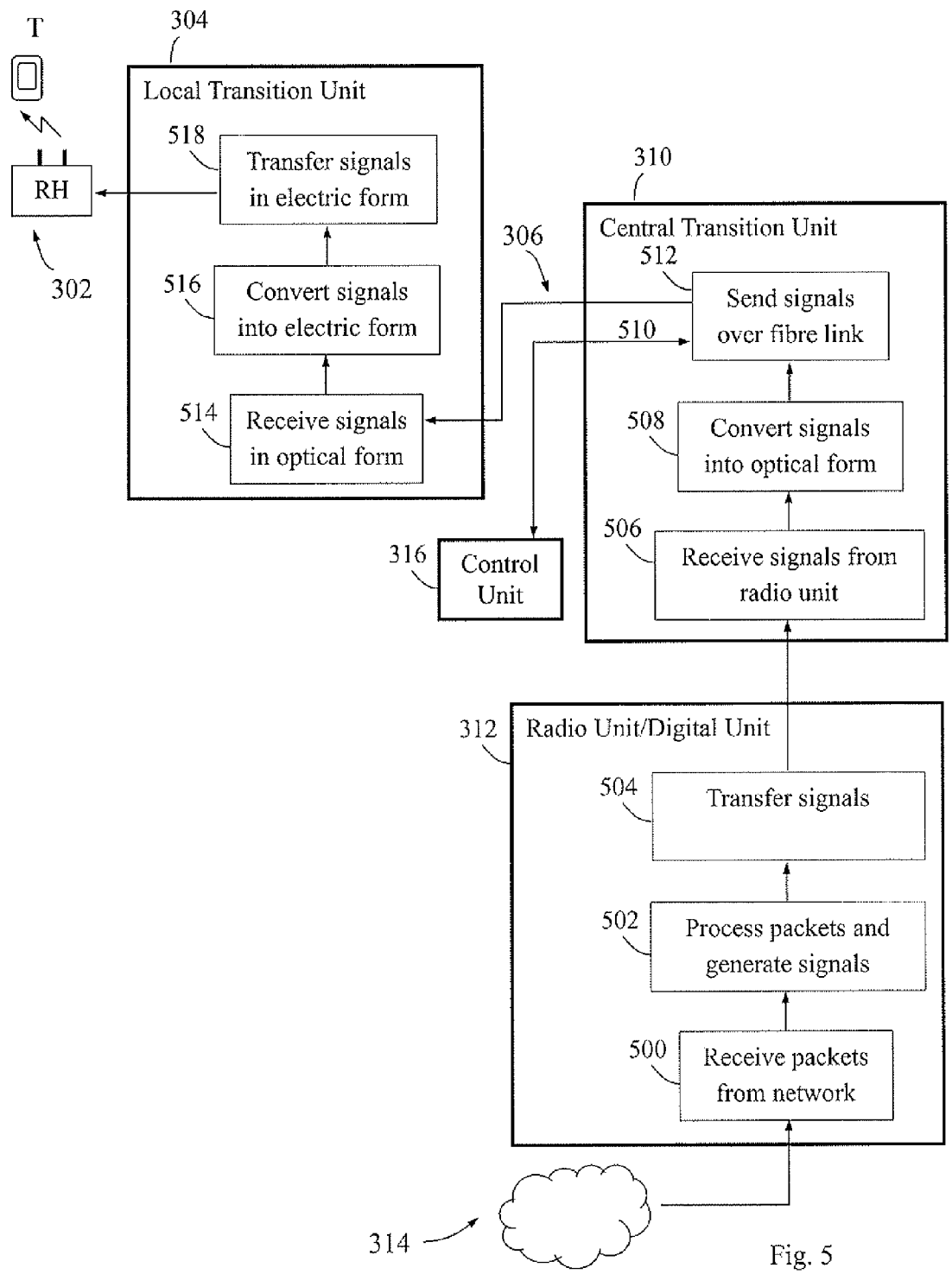
FIG. 5 is a flow chart illustrating a procedure in an arrangement for radio access at a local site when sending signals to a mobile terminal, according to further possible embodiments.

Another exemplifying procedure when radio communication takes place for outgoing signals, will now be described with reference to the flow chart in FIG. 5 which illustrates actions that may be performed by the local transition unit 304, the central transition unit 310 and the radio unit 312, respectively, in the case when the outgoing signals are generated by the radio unit 312 for transmission by the antenna/radio head 302 to the mobile terminal T. A first shown action 500 illustrates that the radio unit 312 receives from the network 314 data packets directed to the terminal T. It is assumed that a communication with the terminal T has been established. The radio unit 312 performs regular processing of the packets and generates signals therefrom to be transmitted from the antenna, as shown by an action 502. The radio unit 312 then conveys the generated signals to the central transition unit 310 in another action 504.

An action 506 shows that the central transition unit 310 receives the signals from radio unit 312, and the central transition unit 310 further converts the received signals into optical form, in an action 508, unless already done by the radio unit 312 which is also a possible option. The central transition unit 310 is also instructed by the control unit 316 to route the signals to the antenna/radio head 302 at the local site 304 based on the above-mentioned configuration data, as shown by another action 510. As in the previous case of incoming signals, the central transition unit 310 may already have received this instruction from the control unit 316 when the antenna/radio head 302 was installed. Accordingly, the central transition unit 310 sends the signals in optical form over the optical link 306 to the local transition unit 304 at the local site, in another action 512. In this action, the central transition unit 310 multiplexes the signals onto the optical link 306 in a suitable manner, depending on the particular antenna/radio head 302 according to the above instruction, e.g. using a specific wavelength for any signals to be transmitted by that particular antenna/radio head 302.

Next, the local transition unit 304 at the local site 304 receives the signals in optical form in an action 514, and converts the signals into electrical form in another action 516. In this action, the local transition unit 304 also de-multiplexes the signals from the optical link 306 depending on the specific wavelength of the received signals in optical form. Finally, the local transition unit 304 transfers the signals according to their former wavelength to the particular antenna/radio head 302, in an action 518, for radio transmission to the mobile terminal T.

Figure 6:
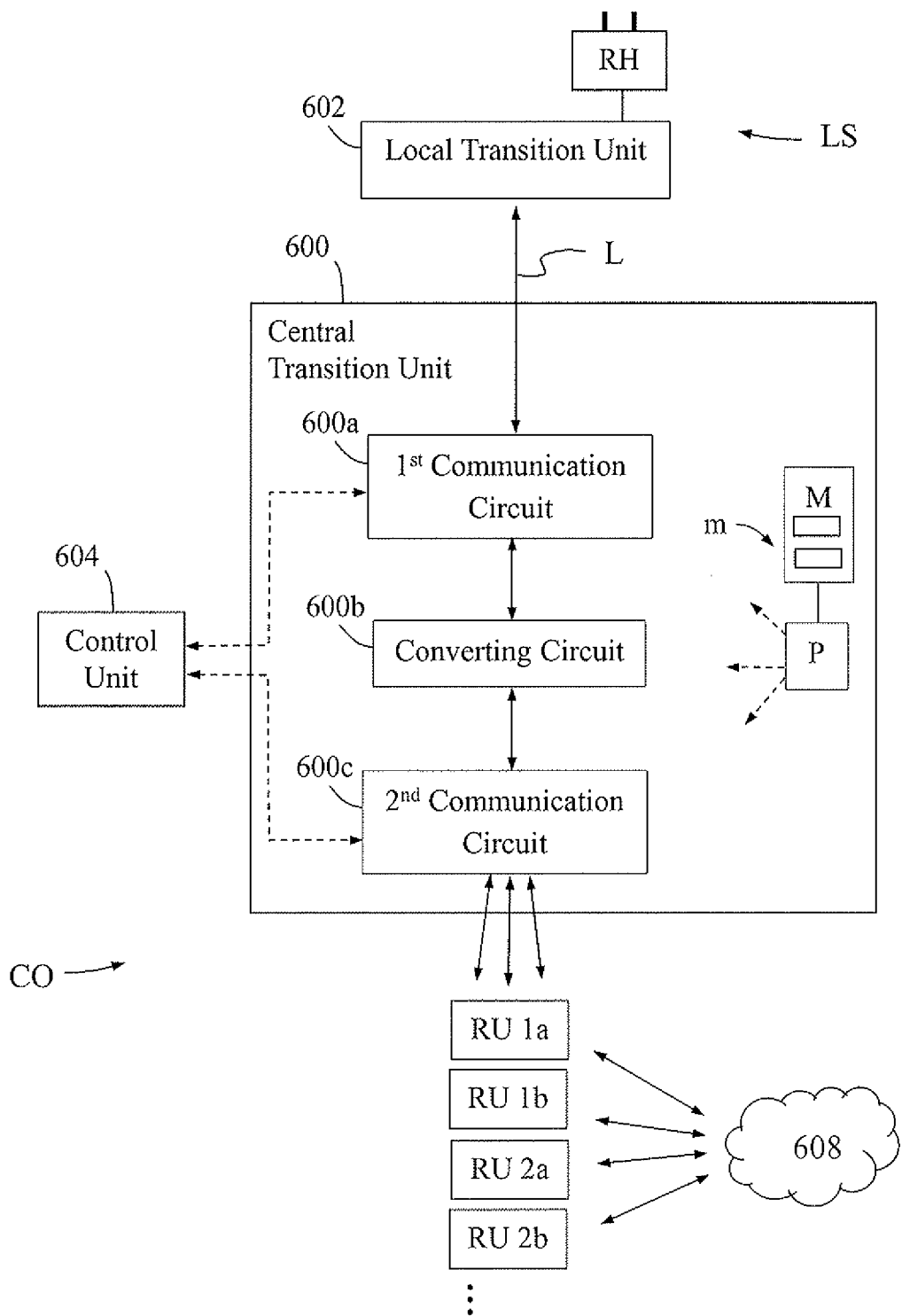
FIG. 6 is a block diagram illustrating a central transition unit in a central office in more detail, according to further possible embodiments.

A detailed but non-limiting example of how a central transition unit may be structured with some possible functional circuits to accomplish the above-described embodiments is illustrated by the block diagram in FIG. 6. The central transition unit 600 is configured to operate at a central office CO and to enable radio access to a communication network 608 for one or more mobile terminals at a local site LS. The central transition unit 600 may act according to the procedures and features described above for any of FIGS. 3-5 as well as the example shown in FIG. 7 to be described further below. The central transition unit 600 and its functional circuits will now be described in terms of a possible example of employing the solution.

The central transition unit 600 comprises a first communication circuit 600a which is adapted to receive, from a local transition unit 602 at the local site, signals in optical form over an optical link L, e.g. in the manner described for action 406 above. The local transition unit 602 has received the signals from at least one antenna and associated radio head RH installed at the local site and has converted the signals into said signals in optical form.

At the installation and activation of an antenna/radio head which is yet un-mapped in the central transition unit, this radio head may only use the in-band control channel over its connection to the central transition unit. This is because no radio signal is transmitted or received by the radio head before it has a full connection to a radio unit RU. Any un-mapped traffic should be routed and forwarded from the first communication unit 600a to a control unit 604 which corresponds to the control unit 316 above. The radio head and the control unit may attempt to identify the analog frequency used for this control channel between the two. At some point they may lock into an IF frequency used as a control channel. As a result, a control connection is established between the control unit and the individual radio head. The control unit 604 can now communicate with the radio head over this channel, to register the characteristics of the newly connected radio head, based on configuration data sent from the radio head at installation as described above. This will then enable the control unit to understand how to treat other IF signals of the radio head connection, used for radio traffic to and from the antenna/radio head. Such signals are however not necessary to rout over the control unit.

The central transition unit 600 also comprises a converting circuit 600b adapted to convert the signals into a form adapted for reception by a radio unit, such as electric form, e.g. as described for action 408 above. The central transition unit 600 also comprises a second communication circuit 600c which is adapted to receive instruction from a control unit 604, e.g. in the manner described for action 410 above and action 7:8 of FIG. 7 below, to route the signals to at least one of a set of radio units RU comprised in or being connected to the central office CO, based on configuration data of the at least one antenna and associated radio head. The configuration data has been registered at the control unit 604 when received in control signaling from the at least one antenna/radio head, and to forward the signals according to the instruction from the control unit 604 to the at least one radio unit for digital processing and transmission over the communication network 608. The converting unit 600b may also be adapted to copy, or multicast, a signal from one incoming logical circuit to multiple outgoing logical circuits.

The above central transition unit 600 and its functional circuits 600a-c may be configured or adapted to operate according to various optional embodiments. In some possible embodiments, the second communication circuit 600c may be adapted to receive outgoing signals from at least one of the radio units RU for radio transmission from the local site. In that case, the converting circuit 600b may be adapted to convert the signals into optical form, and the first communication circuit 600a may further be adapted to receive instruction from the control unit 604 to route the signals to the at least one antenna/radio head at the local site LS based on the configuration data, and adapted to send the signals in optical form over the optical link L to the local transition unit 602 for conversion of the signals into electric form and radio transmission from the at least one antenna/radio head to the terminals.

In another possible embodiment, when the at least one antenna and associated radio head comprises multiple antennas and the signals from the antennas have been multiplexed to the optical link, the central transition unit 600 is adapted to de-multiplex the signals from the optical link. The above-mentioned configuration data may indicate one or more of: at least one radio frequency band supported by the antenna and associated radio head, at least one network operator supported by the antenna and associated radio head, at least one radio technology supported by the antenna and associated radio head, and a maximum transmit power supported by the antenna and associated radio head.

It should be noted that FIG. 6 illustrates various functional circuits in the central transition unit 600 and the skilled person is able to implement these functional circuits in practice using suitable software and hardware. Thus, the solution is generally not limited to the shown structures of the central transition unit 600, and the functional circuits 600a-c may be configured to operate according to any of the features described in this disclosure, where appropriate.

The above-described embodiments may be implemented in a computer program comprising computer readable code which, when run on a central transition unit, causes the central transition unit to perform the above actions e.g. as described for the central transition unit 310 in FIGS. 3 and 4, and for the central transition unit 600 in FIG. 6. Further, the above-described embodiments may be implemented in a computer program product comprising a computer readable medium on which a computer program is stored. The computer program product may be a compact disc or other carrier suitable for holding the computer program. The computer program comprises computer readable code which, when run on a central transition unit, causes the central transition unit to perform the above actions. Some examples of how the computer program and computer program product can be realized in practice are provided below.

The functional circuits 600a-c described above can be implemented in the central transition unit 600 by means of program modules of a respective computer program comprising code means which, when run by a processor "P" causes the central transition unit 600 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the central transition unit 600 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the central transition unit 600.

Figure 7:
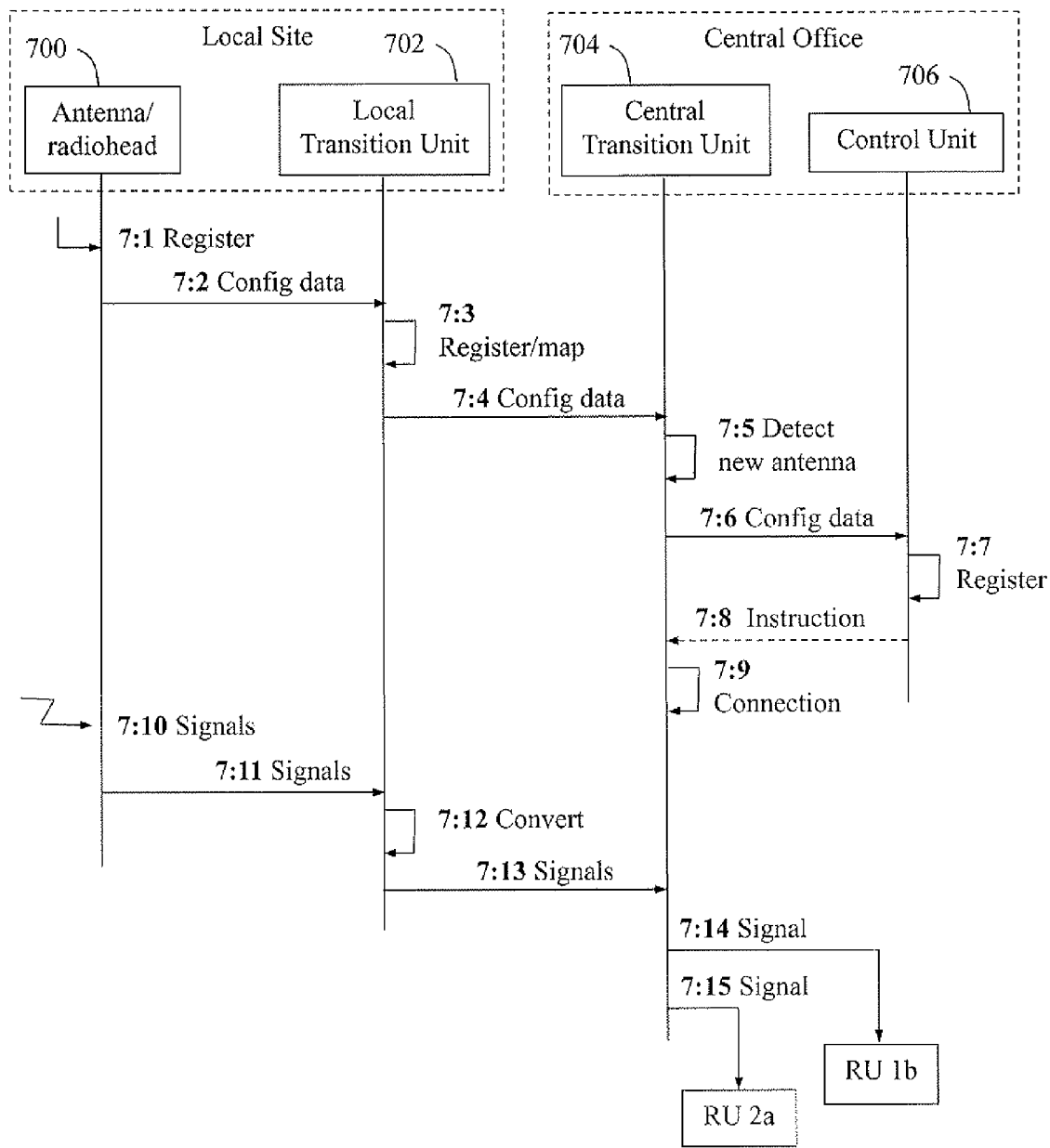
FIG. 7 is a signaling diagram illustrating a procedure when installing and using a new antenna/radio head at a local site, according to further possible embodiments.

An example of how the above arrangement and central transition unit may operate in practice when a new antenna/radio head is installed and used at a local site in communication with a mobile terminal, will now be described in more detail with reference to the signaling diagram in FIG. 7. This figure thus illustrates that an antenna/radio head 700 is being installed at local site having a local transition unit 702 which may be any of the local transition units 304 and 602 described above, and that the central transition unit 704 is controlled by the control unit 706 at the central office, which may be any of the local transition units 310, 600 and control units 316, 604 described above, respectively. There is also an optical link between the local transition unit 702 and the central transition unit 704, equivalent to the links 306 and L in the forgoing figures. Further, it is assumed that a set of radio units are present at the central office including the radio units RU 1a, RU 1b, RU 2a and RU 2b used for different operators and radio technologies, as shown in FIGS. 3 and 6. In this example, the radio technology "a" is LTE and the radio technology "b" is Wifi.

In a practical example, a residential area in the form of a multi-tenant building is served by a copper drop infrastructure via a street cabinet containing equipment for Digital Subscriber Line Access Management, DSLAM, near or in this building, e.g. in the basement of the building. The street cabinet is thus situated at the local site and has fiber access leading to the central office. The copper lines to different apartments in this setup can be physically unbundled, i.e. access to the copper drops to each apartment can be connected to the DSLAM of different operators, which is a commonplace setup.

A user in one apartment now chooses to replace its DSL gear, including any Customer Premises Equipment (CPE), modem, router etc., with the antenna/radio head 700 of this solution. This equipment can be purchased at a fraction of the price that residential subscribers normally pay for traditional DSL services and equipment. This is a relatively simple antenna that can provide for connectivity by any operator and radio access technology to the apartment, e.g. a data rate of a few 100 Mbps over LTE or HSPA or a combination thereof. This can be deemed sufficient to carry any service, including e.g. High Definition Television, HDTV, for most apartments of today.

In the street cabinet, the copper line to the above apartment is disconnected from the DSL DSLAM previously used for fixed broadband access, to the local transition unit 702 which is connected via an optical fibre link to the central transition unit 704 at the central office. The antenna/radio head 700 is further connected to the copper line of the apartment.

A first action 7:1 schematically illustrates that configuration data is registered on the antenna/radio head 700. For example, the configuration data may be hardcoded on the antenna/radio head 700 when manufactured, or the configuration data may be transferred to the antenna/radio head 700 using some NFID or similar mechanism. As mentioned above, the configuration data can be used to identify which operator and radio technology the antenna/radio head 700 is to be associated with. For example, the configuration data may indicate which radio access frequency bands to support over the antenna such as various bands allocated for LTE, HSPA, or Wifi. Since LTE and other 3GPP technologies are licensed, the indicated frequency bands will effectively identify which operator this antenna will be used for. For a frequency band of Wifi radio access, or other unlicensed radio technologies, an explicit coupling may be needed to identify which operator that provides Wifi services over this band. As mentioned above, the configuration data may further indicate directly at least one network operator supported by the antenna/radio head 700, at least one radio technology supported by the antenna/radio head 700, and a maximum transmit power supported by the antenna/radio head 700, e.g. in milliwatts.

When connected, the antenna/radio head 700 uses a low-speed in-band control channel to signal its presence to the local transition unit 702, as illustrated by an action 7:2. After some handshaking and local loop calibration between antenna and the local transition unit 702, the latter may also read and obtain the configuration data stored on the antenna/radio head 700, shown by another action 7:3. In this example, it is assumed that the antenna/radio head 700 is configured to serve two radio access services including a Wifi band of a particular bandwidth, and a pair of LTE-FDD bands of a particular bandwidth. The Wifi band is to be served by the first operator 1 and the LTE bands can be explicitly inferred as belonging to the second operator 2.

Based on this configuration data, the local transition unit 702 is able to identify which central office to connect this antenna to, namely the shown central office with the central transition unit 704. In action 7:3, the local transition unit 702 also maps the antenna/radio head 700 to the optical link leading towards the central transition unit 704 at the central office. The local transition unit 702 further sends the signaled configuration data to the central transition unit 704, in an action 7:4. Alternatively, the local transition unit 702 may simply connect and route the antenna/radio head 700 to the central transition unit, to let the central transition unit 704 itself discover the newly added antenna after which it will communicate directly with the antenna/radio head 700 for registration of the antenna type and other things. In this alternative, the local transition unit can be kept very simple and is only required to route data and signals to the central transition unit, without needing any further dependencies such as control signaling between the two.

The central transition unit 704 is able to recognize, e.g. via optical signal detection, the in-band control channel carrying the configuration data as coming from a newly added antenna/radio head, and hence detects the new antenna/radio head 700 in a further action 7:5 and terminates the received in-band control signaling in the control unit 706, in another action 7:6, thereby establishing a direct signaling channel between the control unit 706 and the antenna/radio head 700. In turn, the control unit 706 reads and registers the configuration data in another action 7:7. Based on the configuration data read from the antenna/radio head 700, the control unit 706 determines that a first baseband signal is a Wifi signal of operator 1 to be up-converted to a specific RF (Wifi) band of radio technology b and should thus be mapped to an interface to the radio unit RU 1b. It similarly determines that another baseband signal is an LTE signal of operator 2 to be mapped onto a pair of LTE bands and conveyed to/from an interface to the radio unit RU 2a. In principle, the radio units Wifi RU 1b and LTE RU 2a can now engage directly with antenna/radio head 700, using the optical link to send and receive RF signals.

At this point, the control unit 706 returns an instruction to the central transition unit 704 in an action 7:8, to instruct the central transition unit 704 to establish a connection between the new antenna/radio head 700 and the radio units Wifi RU 1b and LTE RU 2a belonging to the operators and radio technologies indicated by the configuration data. Establishing the connection at unit 704 is illustrated by an action 7:9. Thereby, a mapping between the antenna/radio head 700 and the radio units RU 1b, RU 2a has been created by the connection, thus enabling the central transition unit 704 to convey incoming and outgoing signals between the antenna/radio head 700 and the radio units RU 1b, RU 2a during communication with the terminal. This connection can be regarded as a semi-permanent connection and the signals to and from the terminal can be conveyed without further involvement of the control unit 706. The control unit thus only terminates the in-band control channel carrying control signals to/from the antenna/radio head 700 but is not involved when radio signals are communicated. In addition, control unit 706 can issue commands to the first and second communication circuits 600a, 600c of the central transition unit, effectively instructing them how to map incoming and outgoing signal flows, respectively. The IF bands carrying actual radio signals to/from the antenna/radio head 700 do not need to be routed over the control unit.

So far, the new antenna/radio head 700 has been registered at the central office by means of the in-band signalling before any radio communication with the terminal over antenna/radio head 700 has taken place, and a connection/mapping between antenna/radio head 700 and the respective radio units RU 1*b*, RU 2*a* has been established in the central transition unit 704. The following further actions illustrate what happens when radio signals of the above two basebands transmitted by mobile terminals are received by the antenna/radio head 700, as initially shown by an action 7:10. The signals are received by the local transition unit 702 in an action 7:11 which signals are converted into optical form in another action 7:12 and sent over the optical link. The signals are transported over the optical link to the central transition unit 704 as shown in a further action 7:13. The central transition unit 704 will then forward the signals to the respective correct radio units, RU 1*b* and RU 2*a* in this case, based on the previously established connection as of action 7:9, illustrated by actions 7:14 and 7:15, respectively. It should be noted that in this example, if the signals are Wifi signals, they are forwarded to RU 1 b as of action 7:14 while if the signals are LTE signals, they are forwarded to RU 2*a* as of action 7:15.

If a configuration parameter in the antenna/radio head 700 needs to be re-configured, for whatever reason, the control unit 706 can disconnect the antenna/radio head 700 to provoke the local transition unit 702 to re-engage with the antenna/radio head 700 and repeat the registration procedure of actions 7:1-7:7. For example, if operator 2 discovers that the LTE signal quality over antenna/radio head 700 is too poor for the LTE radio access services provided to the above apartment, this will be noted by OSS 2. OSS 2 has the means to communicate with control unit 706, e.g. via some mediator or the like that provides secured and controlled access to various antennas via each antenna's control channel. The control unit 706 can then use the control channel to antenna/radio head 700 e.g. to reconfigure power parameters, or disconnect connectivity between the local transition unit 702 and the central transition unit 704 to provoke a re-calibration of the connection between antenna/radio head 700 and the local transition unit 702.

While the solution has been described with reference to specific exemplary embodiments, the description is generally only intended to illustrate the inventive concept and should not be taken as limiting the scope of the solution. For example, the terms "local site", "central office", "radio head", "radio unit", "transition unit" and "control unit" have been used throughout this description, although any other corresponding entities, functions, and/or parameters could also be used having the features and characteristics described here. The solution is defined by the appended claims.

The invention claimed is:

1. A method for providing radio access to a communication network for one or more mobile terminals at a local site, the method comprising:

receiving, by a local transition unit at the local site, analog signals from at least one antenna and associated radio head installed at the local site, when the at least one antenna receives the signals from the one or more mobile terminals, converting, by the local transition unit, the analog signals into optical form, sending, by the local transition unit, the signals in optical form over an optical link to a central office comprising or being connected to a set of radio units, wherein the radio units in the set of radio units are capable of communicating data carried by the signals to and from the communication network according to different radio access technologies and/or for different network operators, converting, by a central transition unit at the central office, the signals into a form adapted for reception by a radio unit in the set of radio units, instructing or having instructed, by a control unit, the central transition unit to route the signals to at least one of the radio units based on configuration data of the at least one antenna and associated radio head, wherein the configuration data is used to identify which operator and radio technology of the different radio technologies and/or for different operators, the at least one antenna and associated radio head is associated with, wherein said configuration data has been registered at the control unit when received in control signalling from the at least one antenna and associated radio head, and forwarding, by the central transition unit, the signals according to the instruction from the control unit to said at least one of the radio units for digital processing and transmission over the communication network, wherein when the at least one antenna and associated radio head are installed at the local site, the at least one antenna and associated radio head:

automatically issue control signals containing the configuration data and provide the control signals to the local transition unit; or issue control signals containing the configuration data to the local transition unit in response to a trigger from the local transition unit.

2. A method according to claim 1, wherein the analog signals received by the local transition unit have been down-converted to an intermediate frequency by the radio head.

3. A method according to claim 1, wherein the configuration data indicates one or more of: at least one radio frequency band supported by the antenna and associated radio head, at least one network operator supported by the antenna and associated radio head, at least one radio technology supported by the antenna and associated radio head, and a maximum transmit power supported by the antenna and associated radio head.

4. A method according to claim 1, wherein the configuration data has been registered on the at least one antenna and associated radio head and the control unit has received the configuration data in said control signalling when the at least one antenna and associated radio head are installed at the local site.

5. A method according to claim 1, wherein the configuration data has been registered at the local transition unit when received in said control signalling, and the local transition unit routes the analog signals to the central office based on the configuration data.

6. A method according to claim 1, wherein when the at least one antenna and associated radio head comprises multiple antennas, the local transition unit multiplexes the signals from the antennas to the optical link and the central transition unit de-multiplexes the signals from the optical link.

7. A method according to claim 1, the method further comprising:

receiving, by the central transition unit, signals from at least one of the radio units for radio transmission from the local site, converting, by the central transition unit, the signals into optical form, instructing or having instructed, by the control unit, the central transition unit to route the signals to the at least one antenna and associated radio head at the local site based on the configuration data, sending, by the central transition unit, the signals in optical form over the optical link to the local transition unit, converting, by the local transition unit, the signals into electric form, and transferring, by the local transition unit, the signals to the at least one antenna and associated radio head for radio transmission to the one or more mobile terminals.

8. A method according to claim 1, wherein the local transition unit is connected to the at least one antenna and associated radio head by a non-optical cable and the local transition unit uses the configuration data to characterize a connection to the at least one antenna and associated radio head by the non-optical cable.

9. An arrangement for providing radio access to a communication network for one or more mobile terminals at a local site, the arrangement comprising:

a local transition unit for operation at the local site and adapted to receive analog signals from at least one antenna and associated radio head installed at the local site, when the at least one antenna and associated radio head receives the analog signals from the one or more mobile terminals, the local transition unit being further adapted to convert the analog signals into optical form and to send the signals in optical form over an optical link to a central office comprising or being connected to a set of radio units, wherein the radio units in the set of radio units are capable of communicating data carried by the signals to and from the communication network according to different radio technologies and/or for different network operators, a central transition unit for operation at the central office and adapted to convert the signals into a form adapted for reception by a radio unit in the set of radio units, and a control unit adapted to instruct the central transition unit to route the signals to at least one of the radio units based on configuration data of the at least one antenna and associated radio head, wherein the configuration data is used to identify which operator and radio technology of the different radio technologies and/or for different network operators, the at least one antenna and associated radio head is associated with, wherein said configuration data has been registered at the control unit when received in control signalling from the at least one antenna and associated radio head, and wherein the central transition unit is further adapted to forward the signals according to the instruction from the control unit to said at least one radio unit for digital processing and transmission over the communication network, wherein when the at least one antenna and associated radio head are installed at the local site, the at least one antenna and associated radio head are further adapted to:

automatically issue control signals containing the configuration data and provide the control signals to the local transition unit; or issue control signals containing the configuration data to the local transition unit in response to a trigger from the local transition unit.

10. An arrangement according to claim 9, wherein the analog signals received by the local transition unit have been down-converted to an intermediate frequency by the radio head.

11. An arrangement according to claim 9, wherein the configuration data indicates one or more of: at least one radio frequency band supported by the antenna and associated radio head, at least one network operator supported by the antenna and associated radio head, at least one radio technology supported by the antenna and associated radio head, and a maximum transmit power supported by the antenna and associated radio head.

12. An arrangement according to claim 9, wherein the configuration data has been registered on the at least one antenna and associated radio head and the control unit is adapted to receive the configuration data in said control signalling when the at least one antenna and associated radio head are installed at the local site.

13. An arrangement according to claim 9, wherein the configuration data has been registered at the local transition unit when received in said control signalling, and the local transition unit is adapted to route the analog signals to the central office based on the configuration data.

14. An arrangement according to claim 9, wherein when the at least one antenna and associated radio head comprises multiple antennas, the local transition unit is adapted to multiplex the signals from the antennas to the optical link and the central transition unit is adapted to de-multiplex the signals from the optical link.

15. An arrangement according to claim 9, wherein:

the central transition unit is adapted to receive signals from at least one of the radio units for radio transmission from the local site, and to convert the signals into optical form, the control unit is adapted to instruct the central transition unit to route the signals to the at least one antenna and associated radio head at the local site based on the configuration data, the central transition unit is adapted to send the signals in optical form over the optical link to the local transition unit, and the local transition unit is adapted to convert the signals into electric form, and to transfer the signals to the at least one antenna and associated radio head for radio transmission to the one or more mobile terminals.

16. A method, performed by a central transition unit when operating at a central office, for providing radio access to a communication network for one or more mobile terminals at a local site, the method comprising:

receiving, from a local transition unit at the local site, signals in optical form over an optical link, the local transition unit having received the signals from at least one antenna and associated radio head installed at the local site and having converted the signals into said signals in optical form, converting the signals into a form adapted for reception by a radio unit, receiving or having received instruction from a control unit to route the signals to at least one of a set of radio units comprised in or being connected to the central office based on configuration data of the at least one antenna and associated radio head, wherein the radio units in the set of radio units are capable of communicating data carried by the signals to and from the communication network according to different radio technologies and/or for different network operators, wherein the configuration data is used to identify which operator and radio technology of the different radio technologies and/or for different network operators, the at least one antenna and associated radio head is associated with, and wherein said configuration data has been registered at the control unit when received in control signalling from the at least one antenna and associated radio head, and forwarding the signals according to the instruction from the control unit to the at least one radio unit, for digital processing and transmission over the communication network, wherein when the at least one antenna and associated radio head are installed at the local site, the at least one antenna and associated radio head:

automatically issue control signals containing the configuration data and provide the control signals to the local transition unit; or issue control signals containing the configuration data to the local transition unit in response to a trigger from the local transition unit.

17. A method according to claim 16, wherein the configuration data indicates one or more of: at least one radio frequency band supported by the antenna and associated radio head, at least one network operator supported by the antenna and associated radio head, at least one radio technology supported by the antenna and associated radio head, and a maximum transmit power supported by the antenna and associated radio head.

18. A method according to claim 16, wherein when the at least one antenna and associated radio head comprises multiple antennas and the signals from the antennas have been multiplexed to the optical link, the central transition unit de-multiplexes the signals from the optical link.

19. A method according to claim 16, the method further comprising:

receiving signals from at least one of the radio units for radio transmission from the local site, converting the signals into optical form, receiving or having received instruction from the control unit to route the signals to the at least one antenna and associated radio head at the local site based on the configuration data, and sending the signals in optical form over the optical link to the local transition unit for conversion of the signals into electric form and radio transmission from the at least one antenna and associated radio head to the one or more mobile terminals.

20. A central transition unit configured for operation at a central office and to enable radio access to a communication network for one or more mobile terminals at a local site, the central transition unit comprising:

a first communication circuit adapted to receive, from a local transition unit at the local site, signals in optical form over an optical link, the local transition unit having received the signals from at least one antenna and associated radio head installed at the local site and having converted the signals into said signals in optical form, a converting circuit adapted to convert the signals into a form adapted for reception by a radio unit, and a second communication circuit adapted to receive instruction from a control unit to route the signals to at least one of a set of radio units comprised in or being connected to the central office based on configuration data of the at least one antenna and associated radio head, wherein the radio units in the set of radio units are adapted to communicate data carried by the signals to and from the communication network according to different radio technologies and/or for different network operators, wherein the configuration data is used to identify which operator and radio technology of the different radio technologies and/or for different network operators, the at least one antenna and associated radio head is associated with, and wherein said configuration data has been registered at the control unit when received in control signalling from the at least one antenna and associated radio head, and to forward the signals according to the instruction from the control unit to the at least one radio unit for digital processing and transmission over the communication network, wherein when the at least one antenna and associated radio head are installed at the local site, the at least one antenna and associated radio head are further configured to:

automatically issue control signals containing the configuration data and provide the control signals to the local transition unit; or issue control signals containing the configuration data to the local transition unit in response to a trigger from the local transition unit.

21. A central transition unit according to claim 20, wherein the configuration data indicates one or more of: at least one radio frequency band supported by the antenna and associated radio head, at least one network operator supported by the antenna and associated radio head, at least one radio technology supported by the antenna and associated radio head, and a maximum transmit power supported by the antenna and associated radio head.

22. A central transition unit according to claim 20, wherein when the at least one antenna and associated radio head comprises multiple antennas and the signals from the antennas have been multiplexed to the optical link, the central transition unit is adapted to de-multiplex the signals from the optical link.

23. A central transition unit according to claim 20, wherein:

the second communication circuit is adapted to receive signals from at least one of the radio units for radio transmission from the local site, the converting circuit is adapted to convert the signals into optical form, and the first communication circuit is adapted to receive instruction from the control unit to route the signals to the at least one antenna and associated radio head at the local site based on the configuration data, and adapted to send the signals in optical form over the optical link to the local transition unit for conversion of the signals into electric form and radio transmission from the at least one antenna and associated radio head to the one or more mobile terminals.

24. A non-transitory computer readable medium on which a computer program is stored, wherein the computer program comprises computer readable code which, when run on a central transition unit, causes the central transition unit to perform the method according to claim 16.

* * * * *